United States Patent [19]
Mochizuki

[11] Patent Number: 6,097,814
[45] Date of Patent: Aug. 1, 2000

[54] METHOD AND APPARATUS FOR CONTROLLING THE REPRODUCTION OF DATA STORED ON A STORAGE MEDIUM METHOD

[75] Inventor: Masaki Mochizuki, Yokohama, Japan

[73] Assignee: Victor Company of Japan, Ltd., Yokohama, Japan

[21] Appl. No.: 09/004,196

[22] Filed: Jan. 8, 1998

[30] Foreign Application Priority Data

| Jan. 10, 1997 | [JP] | Japan | 9-014752 |
| Jan. 21, 1997 | [JP] | Japan | 9-021989 |
| Mar. 31, 1997 | [JP] | Japan | 9-096602 |

[51] Int. Cl.[7] ................................ G06F 12/14
[52] U.S. Cl. .......................... 380/44; 705/57
[58] Field of Search ............ 380/4, 44, 42, 380/3, 201; 705/51, 57, 59

[56] References Cited

U.S. PATENT DOCUMENTS

| 5,400,319 | 3/1995  | Fite et al. .         |         |
| 5,646,993 | 7/1997  | Aizawa               | 380/4   |
| 5,703,952 | 12/1997 | Taylor               | 380/44  |
| 5,881,038 | 3/1999  | Oshima et al.        | 369/59  |
| 5,886,979 | 3/1999  | Moribe et al.        | 369/275.3 |

FOREIGN PATENT DOCUMENTS

| 0 191 162 | 8/1986 | European Pat. Off. . |
| 0 561 685 | 9/1993 | European Pat. Off. . |
| 0 636 962 | 2/1995 | European Pat. Off. . |
| 0 679 977 | 11/1995 | European Pat. Off. . |
| 4-178967 | 6/1992 | Japan . |
| 7-085574 | 3/1995 | Japan . |
| 8-124219 | 5/1996 | Japan . |
| 8-124305 | 5/1996 | Japan . |
| WO 96/16401 | 5/1996 | WIPO . |

*Primary Examiner*—Tod R. Swann
*Assistant Examiner*—Matthew Smithers
*Attorney, Agent, or Firm*—Michael N. Meller; Eugene Lieberstein

[57] ABSTRACT

Plural program information and a BCA (Burst Cutting Area) number of the optical disc (100) is previously recorded in the optical disc (100). A drive ID is stored in the nonvolatile memory (104*a*) of the reproduction apparatus (104). A user of the reproduction appparatus (104) notifies the BCA number, the drive ID, and a number of preferred program information to the software house (software supplier(110) on the condition that the user pays for the reproduction of the preferred program information recorded in the optical disc (100). The software house (110) notifies a cipher key to the reproduction apparatus (104) or the user. A title key is calculated in the reproduction apparatus (104) in accordance with the BCA number, the drive ID, and the cipher key. The preferred information recorded in the optical disc (100) is permitted to be reproduced by using the title key.

7 Claims, 12 Drawing Sheets

METHOD AND APPARATUS FOR CONTROLLING THE REPRODUCTION OF DATA STORED ON A STORAGE MEDIUM METHOD

BACKGROUND OF THE INVENTION

1. Field of the Invention

The present invention relates to a managing system of permitting reproduction of program information when the program information to be reproduced is recorded in an optical disc such as a CD (Compact Disc) or a DVD (Digital Video Disc or Digital Versatile Disc), particularly, and relates to improvements in a cipher key producing method, a cipher key writing method, a cipher key reproduction apparatus, an information reproduction method, an information reproduction permitting method, and a reproduction apparatus of optical disc so as to protect an optical disc from illegal utilization thereof and illegal duplication or copy therefrom.

2. Description of the Related Art

In an optical disc package media such as a CD, all program information contained in an optical disc is disclosed to an owner of the disc, that is, an owner of an optical disc can utilize all program information contained in the disc when the owner possesses the disc. As shown in FIG. 1, a software supplier (software house) 28 supplies an optical disc 11 as indicated by an arrow 15 and collects a fee for the sold optical disc 11 by indicated by an arrow 16. A price of the optical disc 11 is fixed for total program information which is contained in the disc 11. A consumer pays a fixed price for the optical disc 11 in the current distribution system 10, that is, a consumer pays a fixed price for a "possession" of the program information which is contained in the optical disc 11.

Generally, a price of the optical disc 11 is determined primarily for quality and quantity of program information contained in the disc 11, since the optical disc 11 without its program content can be manufactured at an extremely low cost. In a distribution system 10, a consumer is obliged to pay a total cost of the program information contained in the optical disc 11 although not all of such program information are wanted by the consumer. In other words, manufacturers of optical discs are obliged to manufacture wide variety of optical discs in their contents to meet a wide variety of demands by consumers. This causes a price boost of each of such discs. On the other hand, as consumers prefer to purchase optical discs at lower prices, the above situation invites illegally duplicated optical discs sold at very low prices into the market. The above mentioned distribution system 10 is not only unfavorable to the consumers but also increases cost and complexity of distribution for manufacturers and software houses.

In contrast with the above mentioned distribution system 10, a "super distribution system" 20 is known. The "super distribution system" 20 is a system of paying for a "utilization" of the program information not for a "possession" of program information. According to the "super distribution system" 20, a consumer just pays for a utilized program information. The unfavorable deal in the above mentioned distribution system 10 of paying for a "possession" of program information is dissolved by the "super distribution system" 20 and it is supposed to be a more rational system. In the "super distribution system" 20, a utilization state of program information and information of limitation of the utilization are transmitted to a managing system through a communication network.

As shown in FIG. 1, an optical disc 21 is supplied at a low price by a software house 28 a shown by an arrow 25, wherein program information recorded in the optical disc 21 is coded so as to comply with the "super distribution system". An optical disc player 22 which reproduces program information (software) recorded in the optical disc 21 is equipped with a connector 24 for an IC card and a communication port 23 for a telephone line. Data of credited amount for reproduction is prestored in the IC card and the data is renewed at each time when reproducing the program information so as to deduct the credited amount. The communication port 23 is connected to a host computer of a software house 28 through a telephone line wherein reproduction fees of optical discs are collected as indicated by an arrow 26 and a revised credited amount responsive to the reproduction is newly set as indicated by an arrow 27. A software house 28 includes dealers such as retailers and credit card issuing companies.

FIG. 2 shows an example of a "super distribution system". The example is applied to game software. For example, an optical disc 900 recorded with a game software is supplied together with an extra software of a magazine 902 to game players. In other words, a user of the game software obtains the optical disc 900 by purchasing the magazine 902 as indicated by an arrow 911.

An inherent ID (identification) which identifies individual optical discs is recorded on the optical disc 900. To record the inherent ID on prerecorded optical discs individually, the U.S. Pat. No. 5,400,319 discloses a method of recording information of less recording density than the recording density of main information (essential information of an optical disc) on an information recording surface of an optical disc after the optical disc is manufactured. Recording information in a recording area of low packing density is realized by permanently deforming a reflective membrane of a substrate of the optical disc by irradiating a strong laser beam. A typical linear recording density of such a low density information is from $\frac{1}{10}$ to $\frac{1}{1000}$ of the recording density of main information, preferably an extent of from $\frac{1}{40}$ to $\frac{1}{400}$.

A personal computer (or player) 904 which reproduces the optical disc 900 is provided with a connector and a communication port, whereto an IC card 906 and a modem 908 are connected. Data of credited amount for reproducing a game software is prestored in the IC card 906 and the data is renewed at the time upon reproducing the game software so as to deduct the credited amount. The modem 908 is connected to a management computer 910 of a supplier (software house) of the game software through a communication line. In the management computer 910, credited amount is set and reproduction fees are collected.

A user loads the optical disc 900 on the personal computer 904. The personal computer 904 transmits the following information (1) through (4) to the management computer 910 as indicated by an arrow 912: (1) an ID of the optical disc 900 and a drive number of a drive unit which reproduces the optical disc 900, (2) an ID of the game software to be reproduced, (3) an ID of the personal computer 904 as a reproduction device, and (4) an ID of the IC card 906. In the management computer 910, a cipher key (or cipher number) is produced by combining the received information and then the cipher key is transmitted to the personal computer 904 as indicated by an arrow 913. Simplest example is explained as follows with assumption of that the ID of the optical disc is "123", the drive number is "122", the ID (title key) of the game software to be reproduced is "666", and the cipher key is "421". The management computer 910 adds "123" of the optical disc ID, "122" of the drive number both entered by the user, and "421" of the cipher key together. A sum becomes "666" (123+122+421= 666). The number "666" is the title key to be reproduced, then the personal computer 904 reproduces the game software of the title key "666".

Accordingly, before reproducing an optical disc, a user contacts first with a software house to obtain a cipher key which is necessary to utilize program information to be reproduced. Then the user can reproduce the program information by utilizing the cipher key. One software which is related to the cipher key out of several game softwares contained in one optical disc 900 is reproduced. A cost for utilizing the program information is deducted from an amount of money which is prestored in the IC card 906. The user can enjoy a game software within the credited amount of the IC card 906.

Moreover, in the "super distribution system", program information recorded in an optical disc can not be utilized without a cipher key although an optical disc is available, therefore optical discs are prevented from illegal duplication. Since a cipher key is produced in conjunction with the inherent ID of an optical disc, a cipher key can be prepared for individual optical discs, that is, one cipher key can be utilized for just one optical disc. Therefore, it is impossible to utilize one cipher key for various optical discs or for several users.

According to the above mentioned "super distribution system", different cipher keys are prepared for individual optical discs, therefore a user is obliged to manage the cipher keys. Especially, in the case of possessing many optical discs, a user is obliged to enter a different cipher key for a different optical disc whenever reproducing an optical disc. The "super distribution system" is very convenient for a software house so that security for illegal utilization and illegal duplication is enhanced. On the other hand, a cipher key varies by program information, so that managing various cipher keys is rather difficult for a user.

SUMMARY OF THE INVENTION

Accordingly, an object of the present invention is to provide a cipher key producing method suitable for easy management of the cipher key in conjunction with preventing from illegal utilization or duplication of program information.

In order to achieve the above object, the present invention provides, according to an aspect thereof, a cipher key producing method wherein a cipher key is produced by both of or one of ID information which discriminate one optical disc from other optical discs and a drive ID which discriminates one reproduction apparatus for an optical disc from other reproduction apparatuses in conjunction with a specific information which specifies at least one preferred program information to be reproduced out of plural program information recorded in one optical disc. A cipher key is produced for respective program information which are requested to be reproduced or for respective groups of plural program information which are requested to be reproduced.

According to the aspect of the present invention, a cipher key writing method and writing apparatus is provided. A cipher key is additionally written in an area which is continued to or adjacent to an area wherein essential program information of an optical disc is recorded.

According to another aspect of the present invention, a reproduction permitting method is provided. Program information which are recorded in an optical disc is permitted to reproduce when a appropriate cipher key is applied.

In more specific aspect of the present invention, there provided a reproduction method and a reproduction apparatus which reproduces an optical disc written with a cipher key.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

[First Embodiment]

Figure 1:
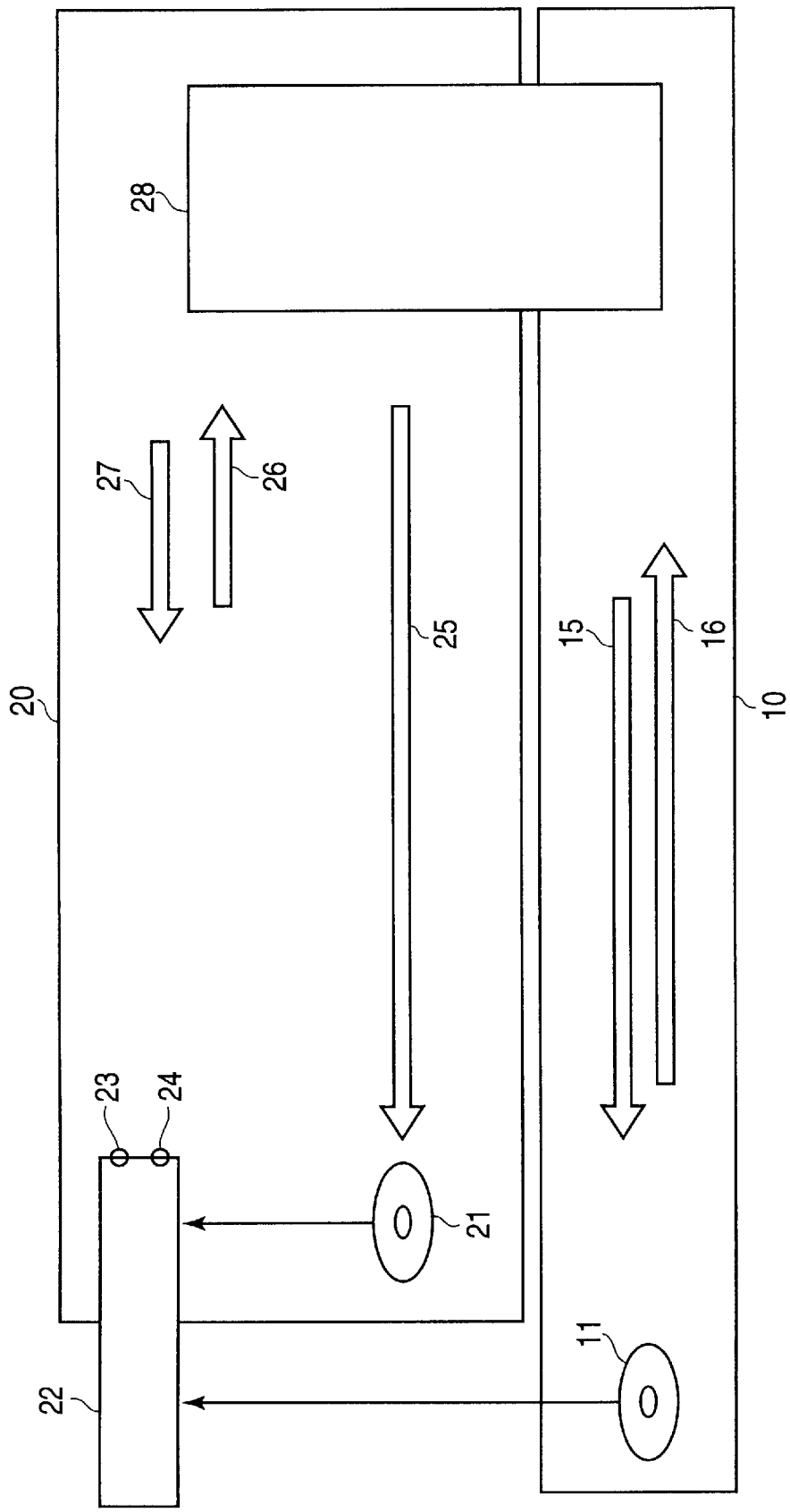
FIG. 1 shows a concept of software supplying system operated between a user and a software supplier (software house) of the prior art.
Figure 2:
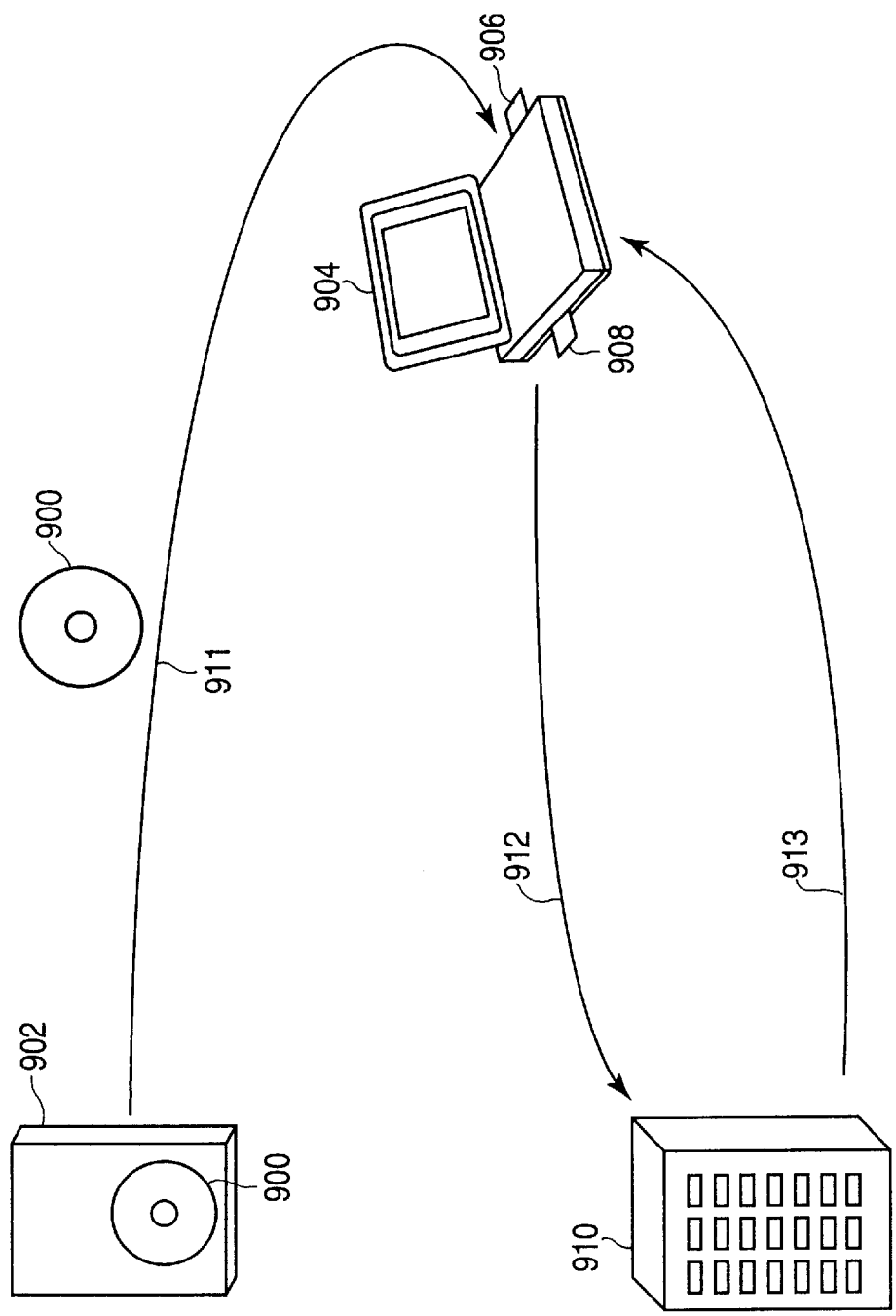
FIG. 2 shows an example of a "super distribution system" of the prior art.
Figure 3:
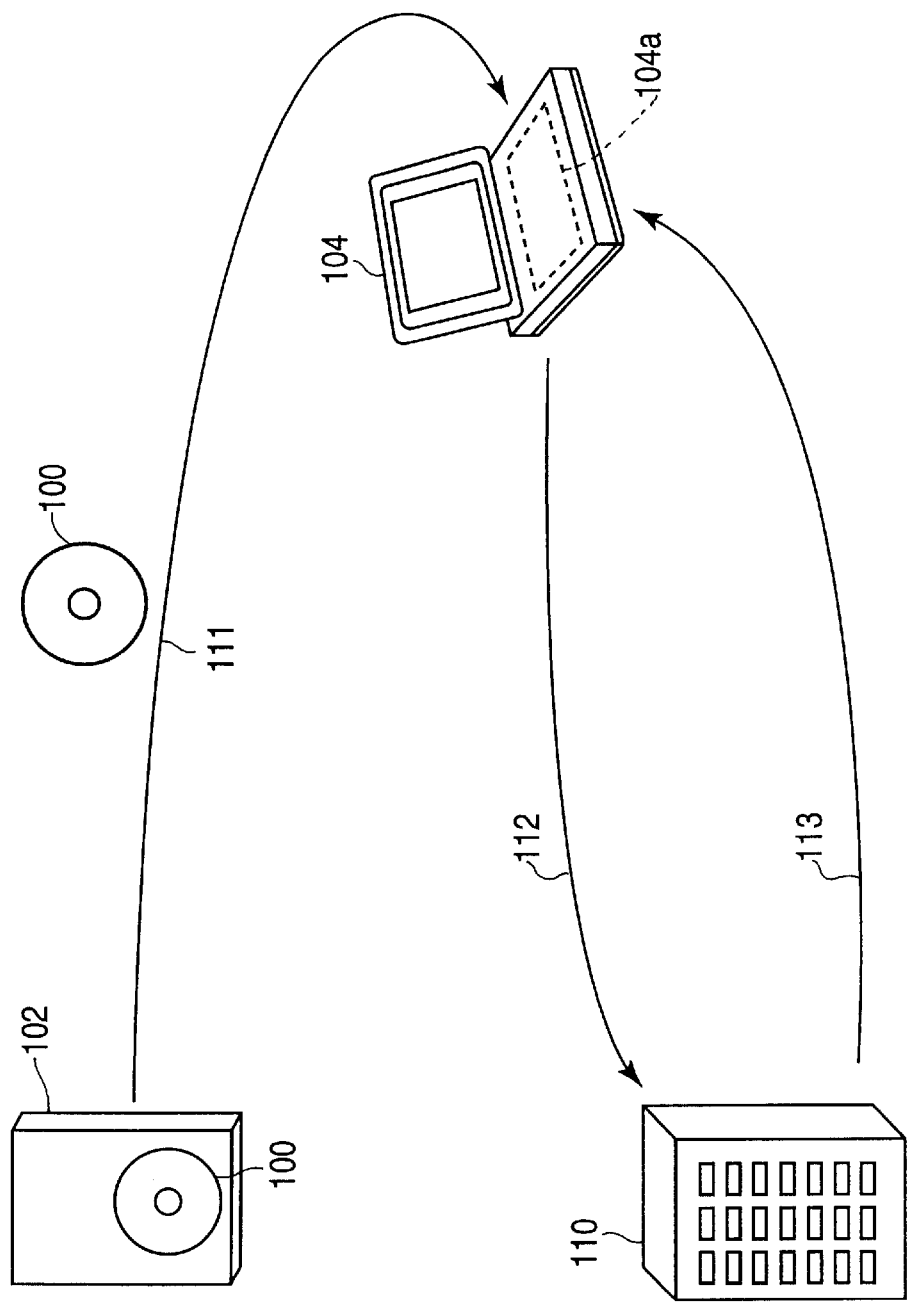
FIG. 3 shows a cipher key producing method, reproducing method of an optical disc, a reproduction apparatus of an optical disc, and a permitting system of reproducing an optical disc according to a first embodiment of the present invention.

FIG. 3 shows a cipher key producing method, reproducing method of an optical disc, a reproduction apparatus of optical disc, and a permitting system of reproducing an optical disc according to the first embodiment of the present invention.

Figure 4:
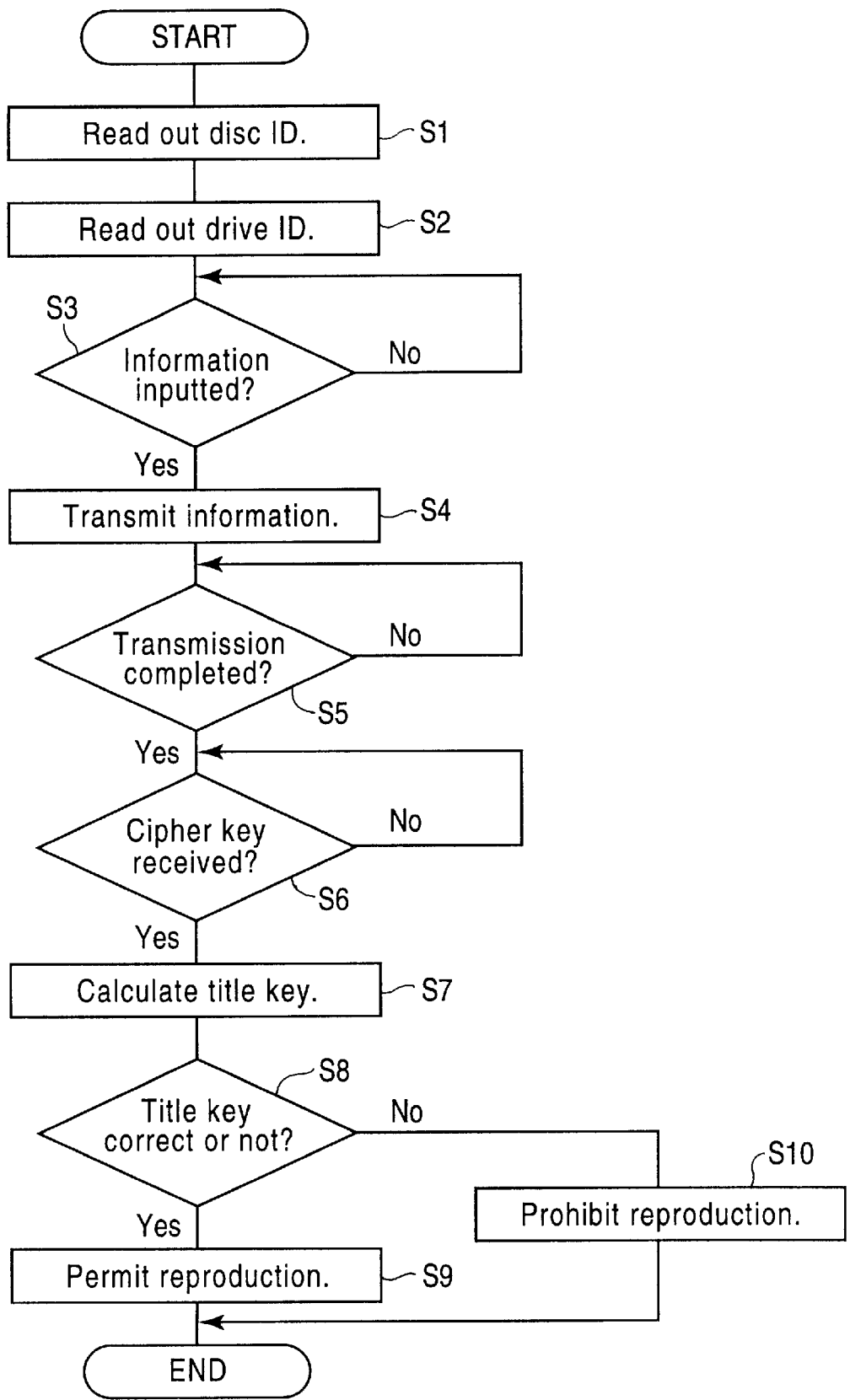
FIG. 4 shows a flow chart of process in a reproduction apparatus of optical disc shown in FIG. 3.

FIG. 4 shows a flow chart of process in a reproduction apparatus of optical disc shown in FIG. 3.

Figure 5:
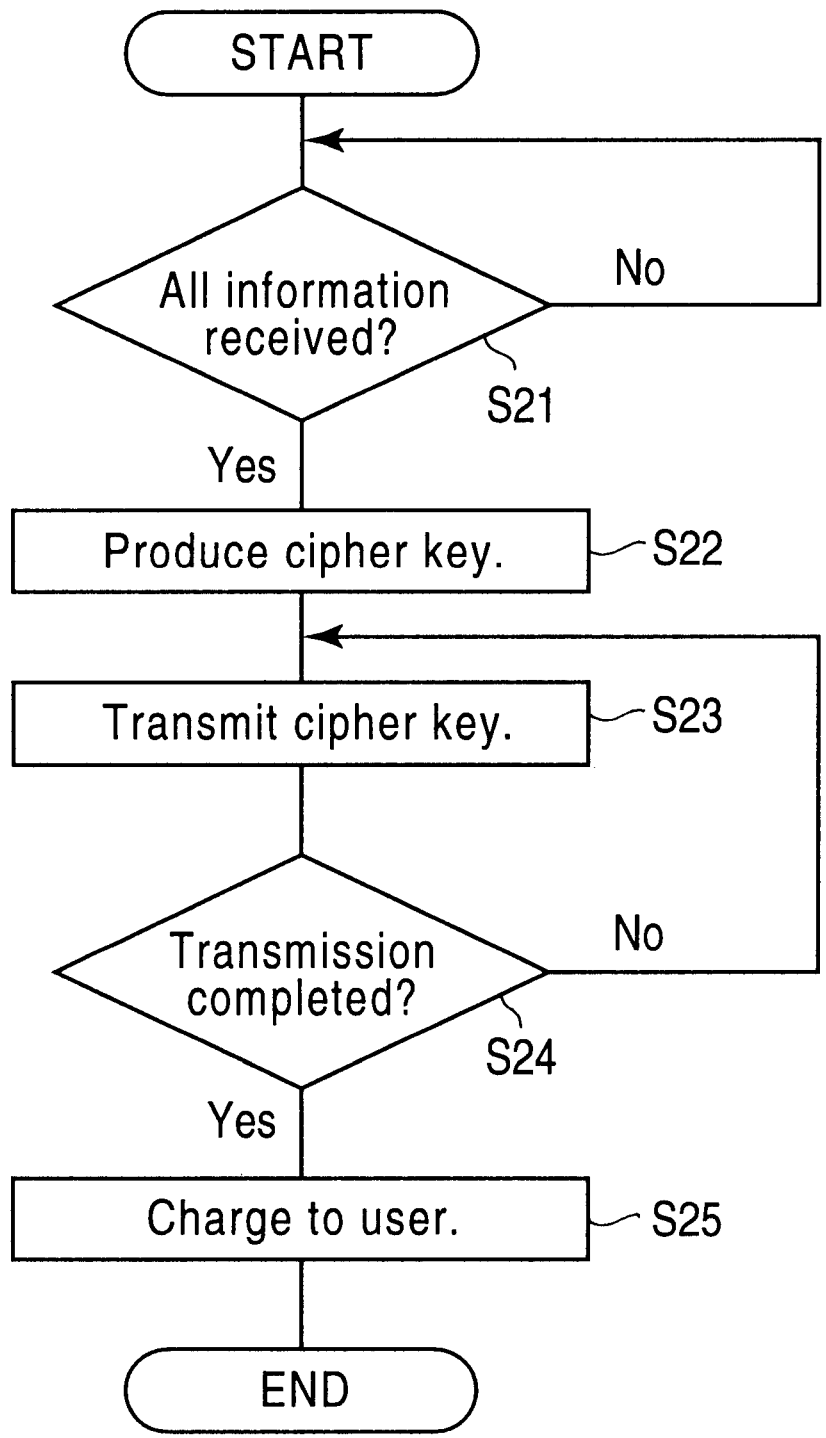
FIG. 5 shows a flow chart of process in a software house shown in FIG. 3.

FIG. 5 shows a flow chart of process in a software house shown in FIG. 3.

In a first embodiment, the present invention provides a cipher key producing method wherein a cipher key is produced by both or one of either ID information which discriminate one optical disc from other optical discs and a drive ID which discriminates one reproduction apparatus of optical disc from other reproduction apparatuses of optical disc in conjunction with information which specifies at least one program information to be reproduced out of plural program information recorded in one optical disc, and wherein a cipher key is produced for individual program information which are requested to be reproduced or for respective groups of plural program information to be reproduced. The present invention also provides a reproduction permitting method wherein reproduction of program information is permitted only when a correct cipher key is inputted.

A total distribution system of game software is shown in FIG. 3 as an example, wherein an optical disc 100 recorded with a game software is reproduced by a reproduction apparatus 104 and a cost for reproduction is collected from a user of the reproduction apparatus 104 by a software supplier (software house) 110 according to a first embodiment of the present invention.

According to the present invention, a reproducing system of an optical disc which is recorded with game software (program information) and title information (hereinafter called as a title key) is provided, wherein the title key is assigned to each game software. The title key is read out from the optical disc to reproduce preferred program information.

In FIG. 3, the optical disc 100 is supplied to a user free of charge or at a low price, for example, as extra software of a magazine 102 as indicated by an arrow 111. In an information area of the optical disc 100, several game softwares and an inherent information (hereinafter called as a disc ID) which discriminates the optical disc 100 from other discs is recorded. Further, a title key is assigned to each game software or a group of game softwares. Furthermore, the title key is numbered correspondingly to a sequential number of softwares one by one according to the first embodiment of the present invention. It is possible to correspond a title key to a file name of software instead. The software house 110 as an optical disc supplier and the reproduction apparatus 104 of a user side can communicate with each other through a telecommunication line, wherein a CPU (Central Processing Unit) an dan interface are equipped as well although they are not indicated in FIG. 3.

In the optical disc 100, two units of address information of an area are recorded, for instance, at a sector head. The one address information is for a first scene of each software for example wherein reproduction is permitted without a cipher key and the other one is for a main data area of software wherein reproduction is prohibited unless a cipher key is entered. The reproduction apparatus 104 is arranged that it can reproduce a first scene of each software for example, however, it is impossible to reproduce succeeding scenes of the software unless a cipher key is entered.

To record the disc ID, binary data which represents the disc ID is recorded on an optical disc 100 as a bar code, after recording information of less packing density than recording density of the main information (essential information of an optical disc) on a surface of the optical disc 100, as the U.S. Pat. No. 5,400,319 discloses. A strong laser beam which is modulated by binary data representing a disc ID is irradiated on an optical disc 100, as a result a reflective membrane of a substrate of the optical disc 100 is permanently deformed at a position of binary data "1" on the optical disc 100 wherein a disc ID is recorded as a bar code such as "reflective =1" or "not reflective =0". In the first embodiment of the present invention, a BCA (Burst Cutting Area) number which is utilized in a DVD (Digital Video Disc) system is recorded as a disc ID. The BCA area is an area extending over plural tracks of inner most part of optically recorded area of an optical disc, wherein a bar code is formed by a strong light beam such as a YAG (yttrium aluminum garnet) laser beam, and wherein another bar code can be written. The BCA number is a information proper to an individual optical disc out of all information written in a BCA area as a bar code. The reproduction apparatus 104 reads out the BCA number and indicates the BCA number in decimal digit for instance. It is possible to provide a recording area by other recording method than BCA number such as magnetic recording area on an optical disc and a magnetic head provided exclusively for readout reads out information from the recording area.

In the reproduction apparatus 104, an inherent drive ID is stored in a nonvolatile storage (memory) 104a or a ROM (Read-Only Memory) so as to be able to electrically read out. A drive ID is indicated on a display of the reproduction apparatus 104 whenever the reproduction apparatus 104 is activated thus a user can obtain the drive ID. The drive ID, and the above mentioned BCA number, and an individual information ID of plural program information recorded in the optical disc 100 are utilized as a code for producing a cipher key. Further, the drive ID is prerecorded in a memory 104a of a reproduction apparatus 104 when it is manufactured. A software house 110 manages that which user possesses a reproduction apparatus with a predetermined drive ID. The managing system will follow.

When an optical disc 100 is loaded, the reproduction apparatus 104 reproduces aforementioned information of the disc 100 wherein reproduction is permitted without entering a cipher key and displays program information. A user can recognize an outline or a first scene of preferred software to be reproduced. However, a cipher key of the software is not known at this stage to the user. A method of obtaining the cipher key will follow on an assumption that the software number to be reproduced is "06" and the title key is "00666" wherein the software number and the title key is actually recorded in the optical disc.

The user or the reproduction apparatus 104 notifies following information to the software house 110 by transmitting a PB (Push Button) signal (dial tone signal) through an analog telecommunication line with a modem or through an ISDN (Integrated Services Digital Network) line as indicated by an arrow 112.

(1) BCA number of the optical disc 100 in 5 digits: "00123" for instance.

(2) Drive ID number of the reproduction apparatus 104 in 5 digits: "00122" for instance, (3) Credit card number for payment for the playing fee, and (4) Number of the software to be reproduced in 2 digits: "06".

The cipher key which permits its reproduction in this case is, for example, defined as follows:

Cipher key =(equals) "Title key" –(minus) "BCA number" –(minus) "Drive ID", that is, $$\text{Cipher key} = 00666 - 00123 - 00122$$
$$= 00421$$

The software house 110 notifies the cipher key "00421" to the user or the reproduction apparatus 104 through a modem or a voice answer back machine on the condition that the user pays for the software number "06" of the optical disc 100 as indicated by an arrow 113.

FIG. 4 is a process flow chart in the reproduction apparatus 104 wherein a title key is produced by utilizing a cipher key which is produced through a communication with the software house 110 shown in FIG. 3. At steps S1 and S2, a disc ID and a drive ID are respectively read out. When a preferred software number and a credit card number are entered (step S3), all information are transmitted to the software house 110 (step S4). When the transmission is completed (step S5), a cipher key is received from the software house 110 and the cipher key is inputted into the reproduction apparatus 104 (step S6), then a title key is calculated as follows in conjunction with the cipher key, and the BCA number which is read out from the optical disc 100, the drive ID which is read out from the own memory 104a (step S7):

Title key =(equals) "Cipher key" +(plus) "BCA number" +(plus) "Drive ID", that is, $$\text{Title key} = 00421 + 00123 + 00122$$
$$= 00666$$

The title key is checked whether it is correct or not (step S8). In case that the title key is correct, reproduction of the software number "06" of the optical disc 100 which is corresponding to the title key "00666" is permitted (step S9). In the case of incorrect, reproduction is prohibited (step S10).

FIG. 5 is a process flow chart in the software house 110. When the software house 110 receives all the information from the user or the reproduction apparatus 104 (step S21), a cipher key is produced according to the aforementioned process (step S22) and the cipher key is transmitted to the user or the reproduction apparatus 104 (step S23). When the transmission is completed (step S24), necessary fee is charged to the user's credit card account in accordance with the credit card number which is received from the user in the step S21 (step S25) and a total process in the software house 110 is completed.

Accordingly, the user of the reproduction apparatus 104 can reproduce a part of program information of the optical disc 100 wherein the part of program information is not necessary to pay for reproduction to the software house 110. However, succeeding program information can not be reproduced unless a title key is obtained from the software house 110 by paying a suitable fee.

Furthermore, the above mentioned process of producing a cipher key is to simplify the explanation, actually the cipher key is produced based on a complex algorithm to increase its security. Numbers of the BCA digits and the drive ID digits used in the above were examples. Number of the drive ID digits can be reduced from 5 to 2. In case that the numbers of the drive ID digits is 2, the same drive ID is applied to several reproduction apparatuses 104. However, it is still effective to prevent from illegal utilization, since the probability to cause the same drive ID is 1/100.

In the above mentioned first embodiment, the system which utilizes individual cipher keys corresponding to individual program information is disclosed. However, a system which utilizes individual cipher keys corresponding to individual groups of program information can be realized. Further, it is possible to utilize either one of a BCA number and a drive ID for producing a cipher key and a title key, although a BCA number and a drive ID are utilized in the embodiment exemplary. In case that only a BCA number is utilized, an optical disc can be reproduced by other reproduction apparatuses once a cipher key is disclosed to other users, that is, security is rather low. However, in case that only a drive ID is utilized, it is impossible to reproduce an optical disc by another reproduction apparatus, that is, security is much higher than a method utilizing a BCA number alone.

In more specific aspect of the present invention, a title key can be utilized for all program information of an optical disc as reproduction permitting information, though the title key is explained as information which specifies one out of plural program information recorded in one optical disc. Further, the title key can be utilized as information which specifies plural combinations of program information recorded in one optical disc. For example, when 4 bytes (equals to 32 bits) are assigned to a title key, 32 kinds of information can be specified in corresponding to individual bits. Therefore, the title key is utilized as reproduction permitting information for plural program information.

In addition thereto, according to the present invention, a cost for reproducing program information is lowered and an optical disc will be prevented from illegal reproduction since a user just pay for specific program information to be reproduced not for all program information recorded in one optical disc. Therefore, an optical disc which contains many program information can be manufactured in large quantities, so that a price of one optical disc can be reduced. Furthermore, a lower price of an optical disc prevents a market from illegal duplication of an optical disc.

According to the present invention, a cipher key is produced for individual program information by utilizing both or one of ID information of an optical disc and a drive ID of a reproduction apparatus in conjunction with individual information ID of plural program information recorded in the optical disc. Reproduction of program information is permitted when a correct cipher key is inputted, so that a cost of program information for a user and a price of an optical disc is lowered, and an optical disc is protected from illegal duplication.

[Second Embodiment]

Figure 6:
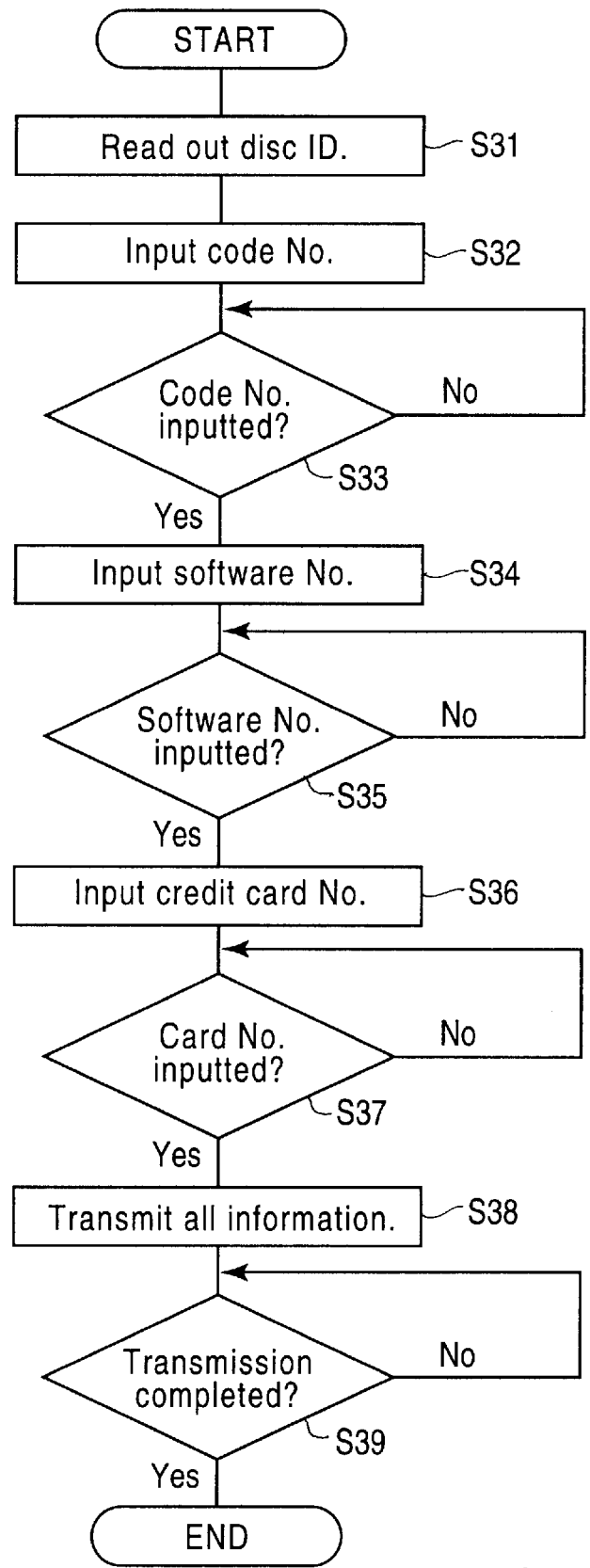
FIG. 6 shows a flow chart of transmission process of information in a reproduction apparatus of optical disc shown in FIG. 3 according to a second embodiment of the present invention.

FIG. 6 shows a flow chart of transmission process of information in a reproduction apparatus of optical disc shown in FIG. 3 according to the second embodiment of the present invention.

Figure 7:
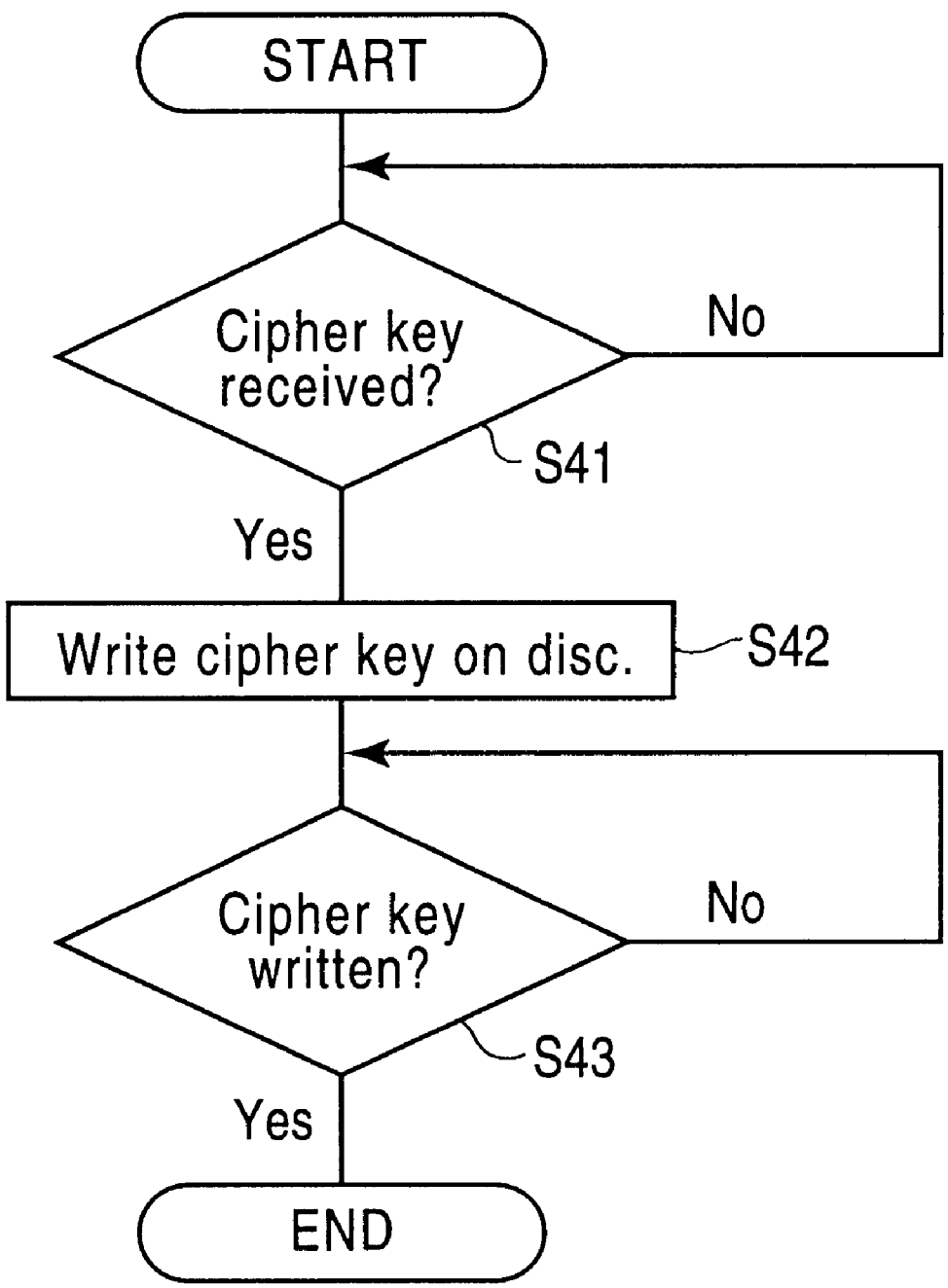
FIG. 7 shows a flow chart of receiving process of a cipher key and writing process of a cipher key to an optical disc in a reproduction apparatus of optical disc shown in FIG. 3 according to the second embodiment of the present invention.

FIG. 7 shows a flow chart of receiving process of a cipher key and writing process of a cipher key to an optical disc in a reproduction apparatus of optical disc shown in FIG. 3 according to the second embodiment of the present invention.

Figure 8:
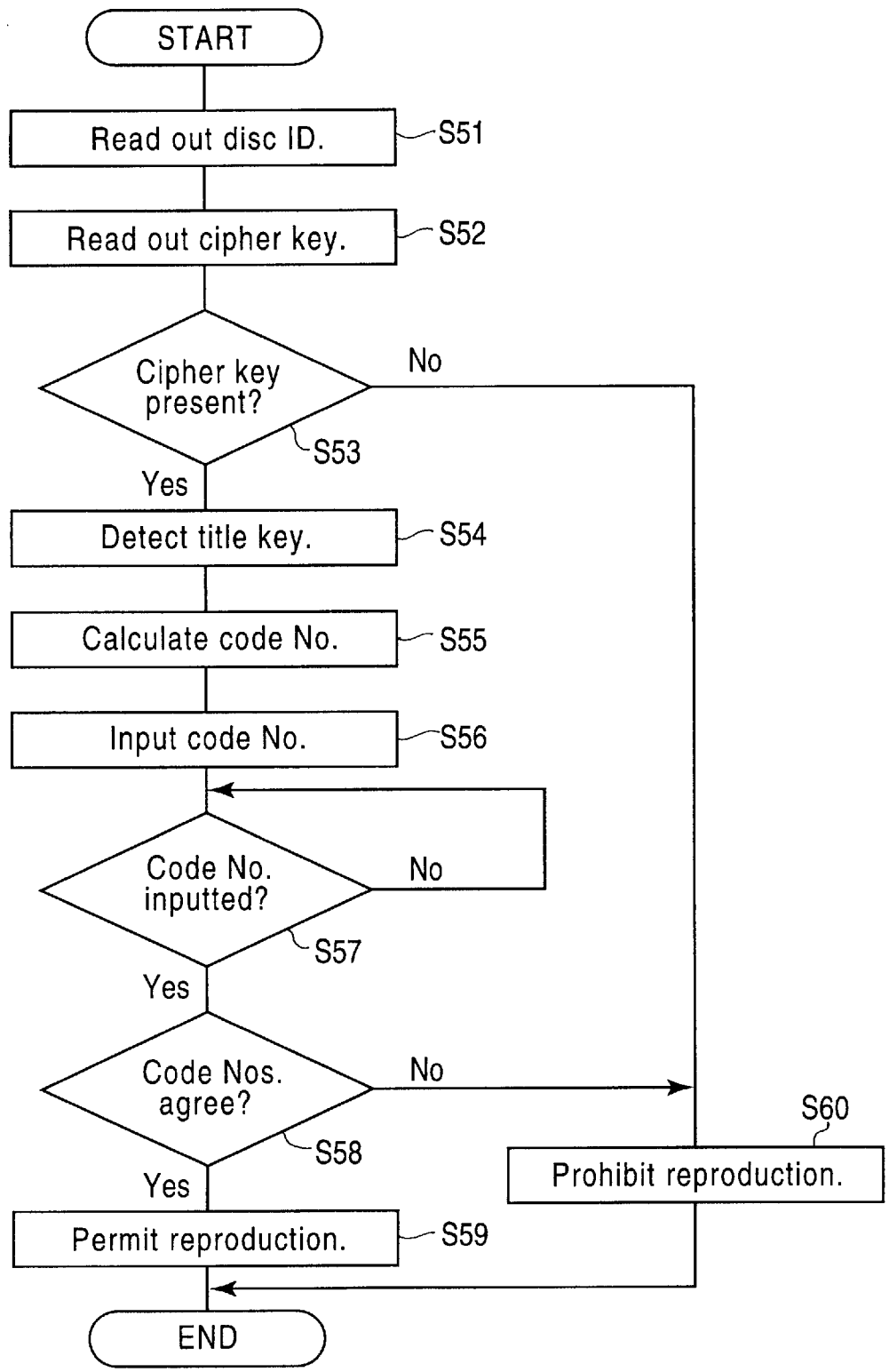
FIG. 8 shows a flow chart of permitting or prohibiting reproduction process in a reproduction apparatus of optical disc shown in FIG. 3 according to the second embodiment of the present invention.

FIG. 8 shows a flow chart of permitting or prohibiting reproduction process in a reproduction apparatus of optical disc shown in FIG. 3 according to the second embodiment of the present invention.

Figure 9:
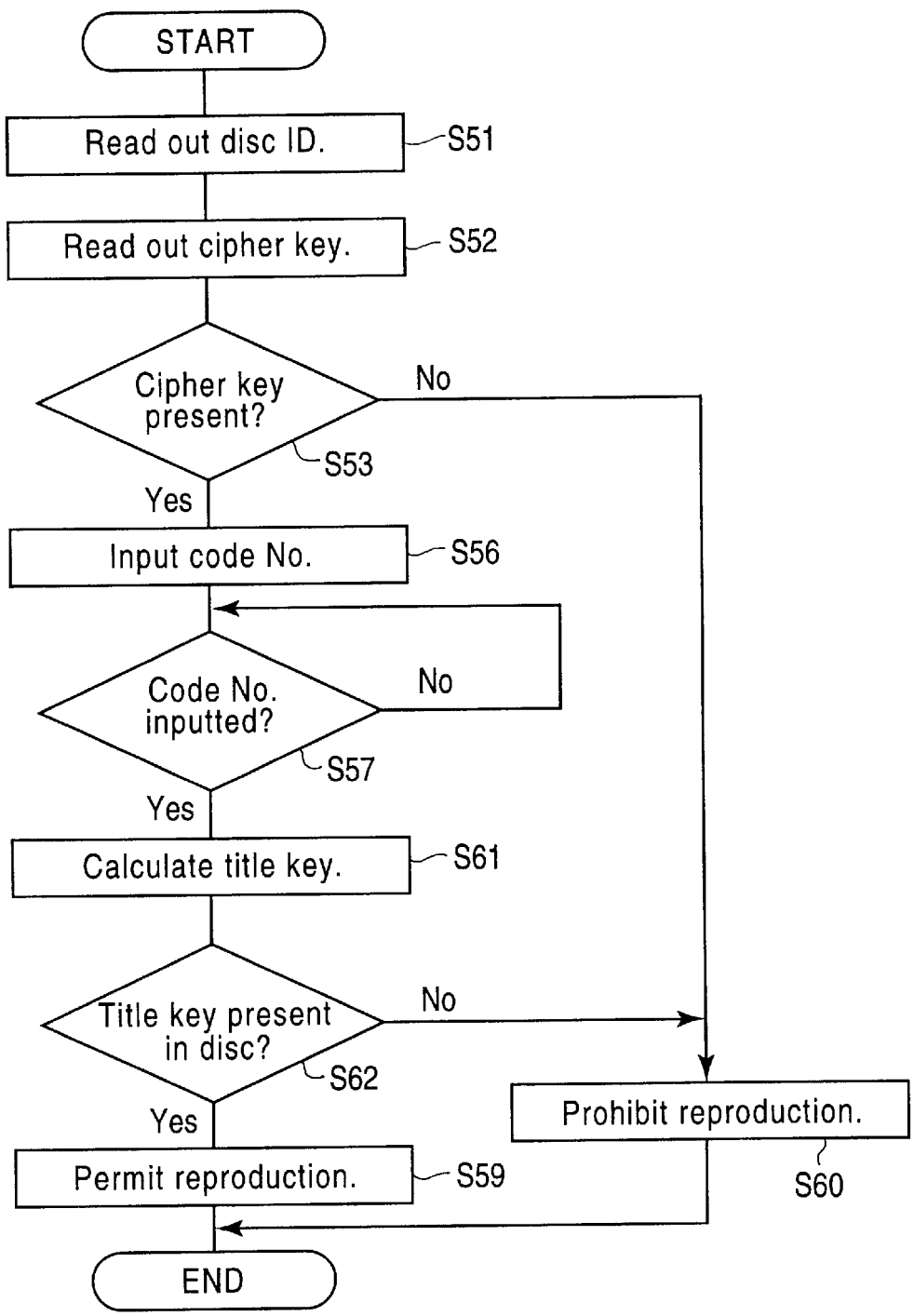
FIG. 9 shows another flow chart of permitting or prohibiting reproduction process in a reproduction apparatus of optical disc shown in FIG. 3 according to the second embodiment of the present invention.

FIG. 9 shows another flow chart of permitting or prohibiting reproduction process in a reproduction apparatus of optical disc shown in FIG. 3 according to the second embodiment of the present invention.

In a second embodiment of the present invention, a cipher key is produced from inherent information of an optical disc and a code number which is assigned by a user through an operational process based on a predetermined algorithm.

In FIG. 3, a reproduction apparatus 104 is provided with a ten key pad for inputting the code number by a user. The code number, the aforementioned BCA number, and the title key which specifies at least one preferred program information out of plural program information recorded in an optical disc are utilized for producing a cipher key.

When an optical disc 100 is loaded, the reproduction apparatus 104 reproduces program information of the disc 100 wherein reproduction is permitted without inputting a cipher key and displays contents of the program information. A user can recognize an outline or a first scene of desired software to be reproduced. However, a cipher key of the software is not known to the user. A method of obtaining the cipher key will follow on an assumption that a software number to be reproduced is "01" and the title key is "08001".

The user or the reproduction apparatus 104 notifies following information to the software house 110 by transmitting a PB (Push Button) signal (dial tone signal) through a analog telecommunication line with a modem or an ISDN (Integrated Services Digital Network) line as indicated by an arrow 112.

(1) BCA number of the optical disc 100 in 5 digits: "00123" for instance, (2) Code number optionally assigned by a user: "01010" for instance, (3) Credit card number for payment for the playing fee, and (4) Number of the software to be reproduced in 2 digits: "01".

The cipher key which permits reproduction is, for example, defined as follows:

Cipher key =(equals) "Title Key" –(minus) "BCA number" –(minus) "Code number", that is, $$\text{Cipher key} = 08001 - 00123 - 01010$$
$$= 06868$$

The software house 110 notifies the cipher key "06868" to the user or the reproduction apparatus 104 by a modem or a voice answer back machine on the condition that the user pays for the software number "01" of the optical disc 100 as indicated by an arrow 113.

FIG. 6 is a process flow chart in the reproduction apparatus 104 wherein suitable information is transmitted to the software house 110. In a step S31, a disc ID is read out. In a step S32, the reproduction apparatus 104 requests the user to input a code number. The user assigns the code number and then inputs the code number by a ten key pad which is provided in the reproduction apparatus 104. Once the input is confirmed (step S33), a software number is requested to be inputted (step S34). When the input of the software number is confirmed (step S35), a credit card number is requested to be inputted (step S36), then the input of the credit card number is confirmed (step S37). When all the required information are inputted, they are transmitted to the software house 110 (step S38). The transmission process comes to an end when the transmission is completed (step S39).

A process in the software house 110 is the same process shown in FIG. 5 in the first embodiment.

FIG. 7 shows a process of writing a cipher key which is transmitted from the software house 110 on the optical disc 100 in the reproduction apparatus 104. When a reception of cipher key is confirmed (step S41), the cipher key is written in a predetermined area of the optical disc 100 (step S42). When completion of writing the cipher key is confirmed (step S43), the process comes to an end. Therefore, the reproduction apparatus 104 also functions as a cipher key writing apparatus. An add-on writing area as a part of BCA area is available for above mentioned predetermined area of an optical disc wherein a cipher key is written. The add-on writing area of BCA area is a part of BCA area wherein a disc ID is recorded as a BCA number and the add-on writing area is continued to or adjoined to the area wherein a BCA number is recorded. An add-on writing area of a bar code which is continued in a circumference direction to a recording area of a disc ID in a BCA area, is provided as a continuous area. An add-on writing area of a bar code which is adjoined in a radius direction of the disc, is also provided as an adjoined area.

FIG. 8 is a flow chart of reproduction permitting process performed in the reproduction apparatus 104. A cipher key which is produced in the software house 110 is written on an optical disc 100 by the process explained with reference to FIG. 7. A disc ID is read out (step S51) and the cipher key is also read out (step S52). These information are recorded in a BCA area and are read out as a bar code. When the presence of cipher key is confirmed (step S53), a title key is detected (step S54) wherein detection of the title key is to find a number which is corresponding to a software number to be reproduced. Here, a title key "08001" which is corresponding to a software number "001", for example, is detected.

In a step S55, a code number is calculated by a following equation by utilizing the disc ID, the cipher key, and the title key:

Code number =(equals) "Title key" –(minus) "BCA number" –(minus) "cipher key", that is, $$\text{Code number} = 08001 - 00123 - 06868$$
$$= 01010$$

The code number calculated by the above mentioned equation is defined as a calculated code number. Entering the code number is required for the user (step S56), hereinafter the code number is defined as an entered code number. In a step S57, it is judged whether the entered code number is inputted or not. When the entered code number is inputted, it is judged whether the entered code number agrees with the calculated code number or not (step S58). In the case of agreement, reproduction of the software number "01" of the optical disc 100 which is corresponding to the title key "08001" is permitted (step S59). In case that the entered code number does not agree with the calculated code number or the cipher key is not detected in the step S53, reproduction is prohibited or permitted only of a restricted area (step S60).

According to another aspect of the present invention, a title key can be calculated by an entered code number instead of judging whether an entered code number inputted by a user agrees with a code number calculated by an above mentioned equation. FIG. 9 is a flow chart of judging process of reproduction of software by calculating a title key. Explanation of the step same as those shown in FIG. 8 are omitted for simplicity. In FIG. 9, when a presence of a cipher key is confirmed (step S53), an input of a code number is required for a user (step S56). When the input of the code number is confirmed (step S57), a title key is calculated by a following equation (step S61):

Title key =(equals) "BCA number" +(plus) "Cipher key" +(plus) "code number", that is, $$\text{Title key} = 00123 + 06868 + 01010$$
$$= 08001$$

It is judged whether a title which is corresponding to the calculated tile key is present in an optical disc 100 or not (step S62). In the case of present, reproduction of an applicable title is permitted (step S59). In case that an applicable title is not present or a cipher key is not detected in the step S53, reproduction is prohibited or permitted only for restricted area (step S60).

In other word, a user of a reproduction apparatus 104 can reproduce program information of an optical disc 100, which is not necessary to be paid. However, succeeding program information can not be reproduced unless a title key is obtained from the software house 110 by paying a suitable fee for the program information.

A disc ID is assigned as "00123" in the above mentioned aspect. However, considering a case of reproducing program information of other optical discs, a disc ID of another optical disc is assigned as "00150". A cipher key is produced in the software house 110 as shown in FIG. 5. In case that a disc ID, a code number, and a title key are assigned as "00150", "01010", and "08001" respectively. A cipher key of another optical disc is calculated as follows:

Cipher key="title key"−"disc ID"−"code number"

$$\text{Cipher key} = \text{"title key"} - \text{"disc ID"} - \text{"code number"}$$
$$= 08001 - 00150 - 01010$$
$$= 06841$$

The new cipher key "06841" is written on another optical disc through the process shown in FIG. 7. A code number or a title key is produced from the new cipher key. Therefore, when reproducing program information from the optical disc (disc ID "00150"), preferred software can be reproduced by entering the same code number "01010" as for the optical disc (disc ID "00123").

In the above mentioned aspect, it is explained that a produced cipher key is written in an add-on writing area of BCA area, that is, the cipher key is written in an area which is continued to or adjoined to a recording area of a disc ID. However, it is possible to record a cipher key in a area further innermost area of an optical recording area, that is, in a magnetic recording area which is provided in a labeling part of an optical disc by means of magnetic recording.

The above mentioned process of producing a cipher key is to simplify the explanation, actually a cipher key is produced by using a complex algorithm to increase security. Numbers of disc ID digits and code number digits mentioned were mere examples. It is possible to utilize an alphabet, other characters, or alphanumeric figures instead of numeric figures for the code number and also possible to change the number of code digits. It is said that a longer code number is more preventive for illegal utilization of the code. However, too many digits make it difficult to remember or input such code numbers. A range of one byte through 30 bytes is preferable for a code number.

A title key is explained as information which specifies one out of plural program information recorded in one optical disc. However, it is possible to utilize a title key as reproduction permitting information for total program information of one optical disc. Further, a title key is possible to be utilized as information which specifies a combination of plural program information recorded in one optical disc. When 4 bytes (equals to 32 bits) are assigned to a title key, a title key is utilized for reproduction permitting information for plural program information, since 32 kinds of information can be specified in accordance with respective bits.

A disc ID is not necessary to be a BCA number itself. It is acceptable that the BCA number is encoded in a reproduction apparatus so that information of a BCA number is accurately contained. In this case, it is more effective method to increase security of a cipher key though a decoding function is necessary to a reproduction apparatus. A reproduction apparatus is explained as an add-on information writing device of a cipher key in the above mentioned second embodiment. However, it is possible to provide an optional device as the add-on information writing device of a cipher key so that a received cipher key is inputted into the add-on information writing device and recorded in a disc ID area as a bar code or in a magnetic recording area by means of magnetic recording.

Further, a cipher key which is transmitted from a software house is not necessary to be a cipher key itself. A cipher key is acceptable to be in an encoded form, which is not recognized by a user. When writing a cipher key or reading a cipher key for reproducing an optical disc, the encoded cipher key is decoded and a title key is produced. A cipher key information which is additionally recorded in a disc ID recording area is acceptable to be additionally recorded as far as nonrecorded area is remaining in a disc ID recording area.

Furthermore, a code number is possible to be changed after contacting with a software house in regard to changing a code number, if a code number which is assigned by a user becomes inconvenient for the user, the user may request the software house to replace such code number.

Moreover, in an optical disc provided with an magnetic recording area, a cipher key information written in the magnetic recording area is rewritable. A code number can be changed also in this case after contacting with a software house for a change of such a code number, if the code number assigned by a user is inconvenient for the user. In the case of adding information desired to be utilized when the optical disc includes many information, it is possible to add a new cipher key or to replace a current cipher key with a new cipher key which includes previous cipher key information. It is convenient for a user that the same code number previously utilized is still usable.

It is possible to assign different code numbers for plural program information or to restrict reproduction of a combination of arbitrary titles. One specified information which specifies at least one preferred program information out of plural program information recorded in an optical disc is equal to one information which permits reproduction of one preferred program information out of plural program information recorded in an optical disc and such information is reproduction restricting information itself. Therefore, information which is utilized as a title key is reproduction restricting information. In the case of just one title, that is, one program information, the information is equal to reproduction permitting information of an optical disc.

According to the present invention, as a cipher key is automatically produced by utilizing a code number which is arbitrarily assigned by a user, complicated management of cipher keys is not necessary for a user and selective reproduction permission of program information is realized by utilizing a code number which is common to several optical discs. Therefore, a user can reproduce program information more conveniently. A cost for reproducing program information and a price of an optical disc is reduced so as to prevent a optical disc from illegal duplication.

[Third Embodiment]

Figure 10:
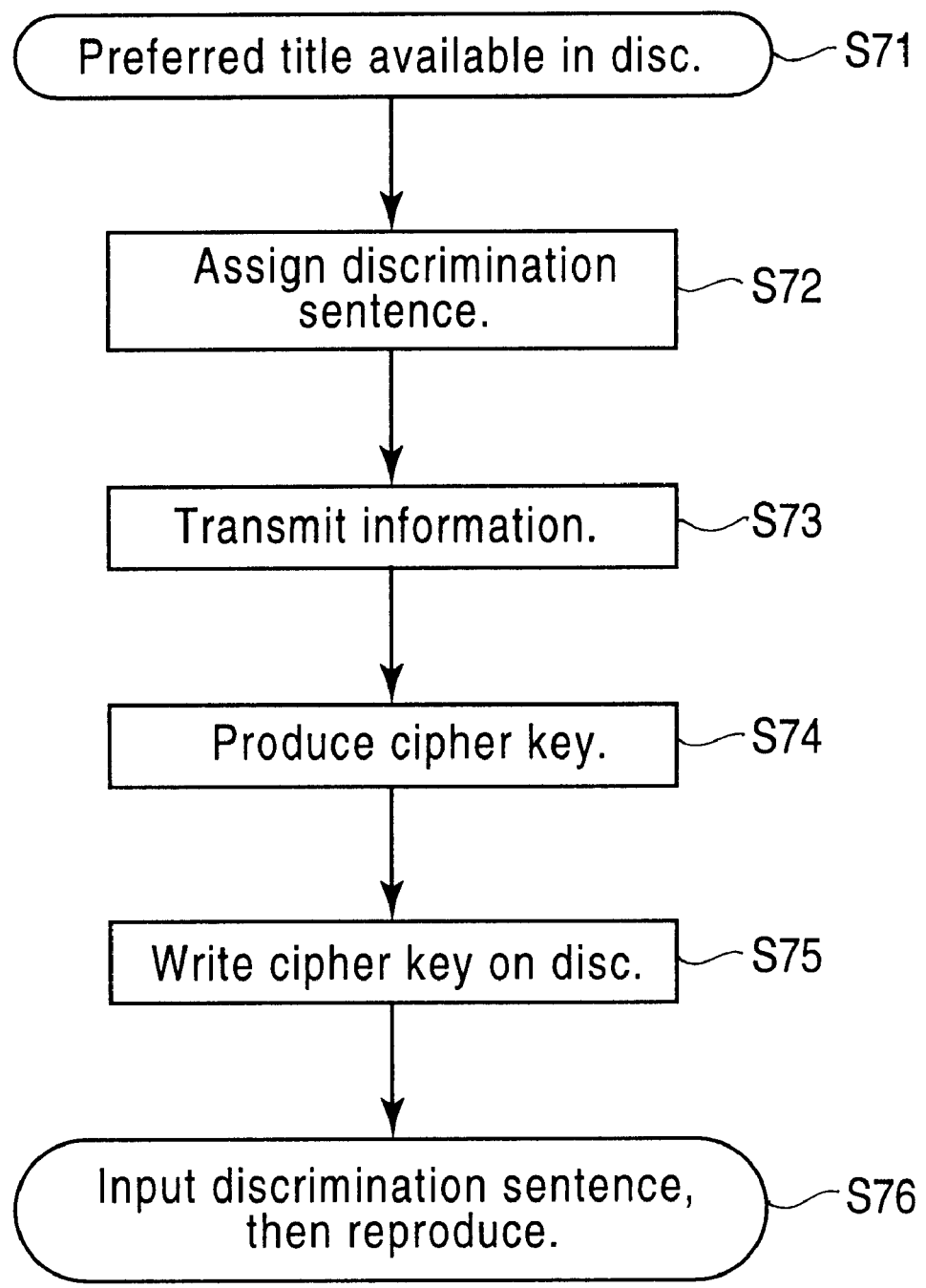
FIG. 10 shows a flow chart of producing and writing process of a cipher key according to a third embodiment of the present invention.

FIG. 10 shows a flow chart of producing and writing process of a cipher key according to a third embodiment of the present invention.

Figure 11:
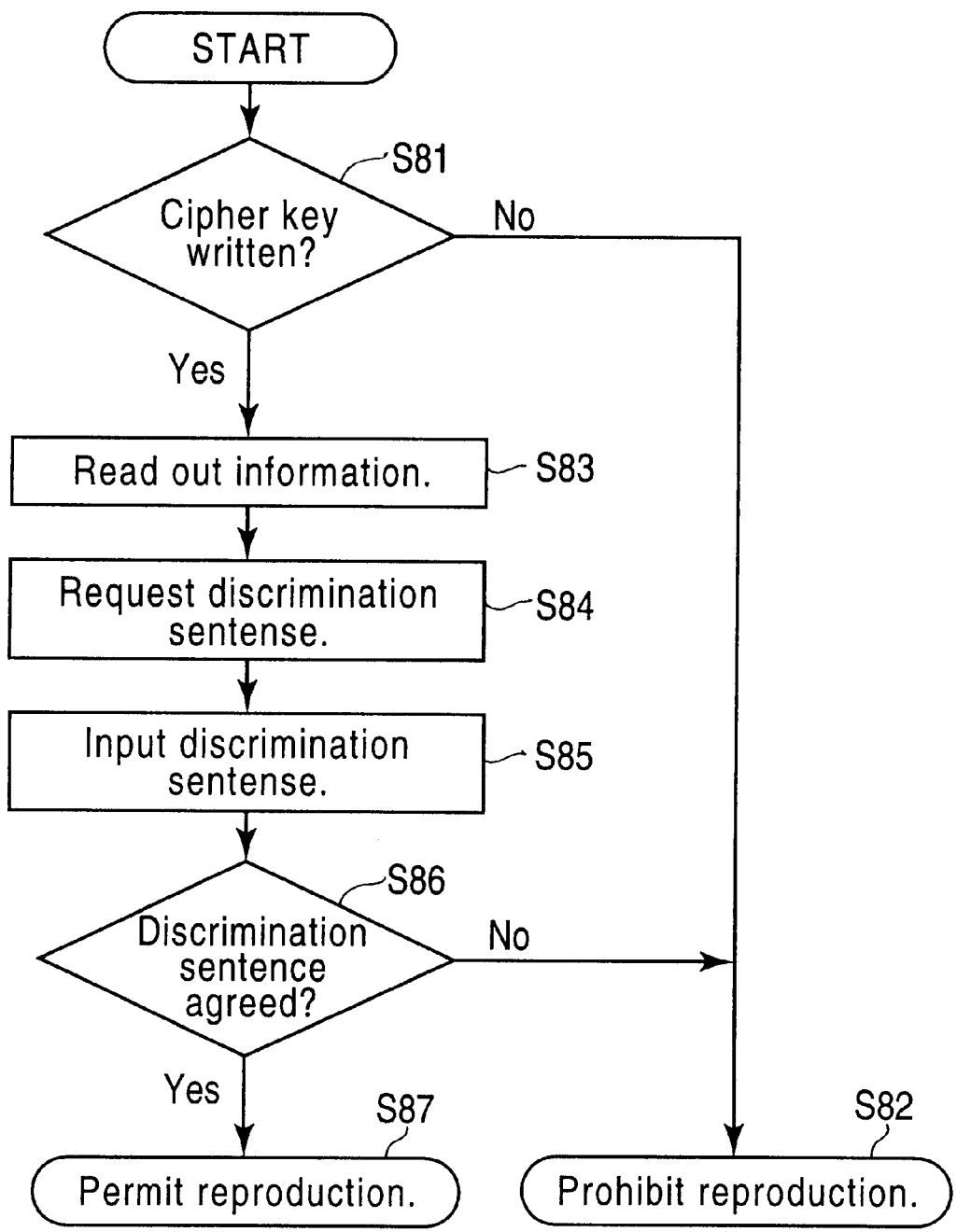
FIG. 11 shows a flow chart of reproduction process of an optical disc according to the third embodiment of the present invention.

FIG. 11 shows a flow chart of reproduction process of an optical disc according to the third embodiment of the present invention.

Figure 12:
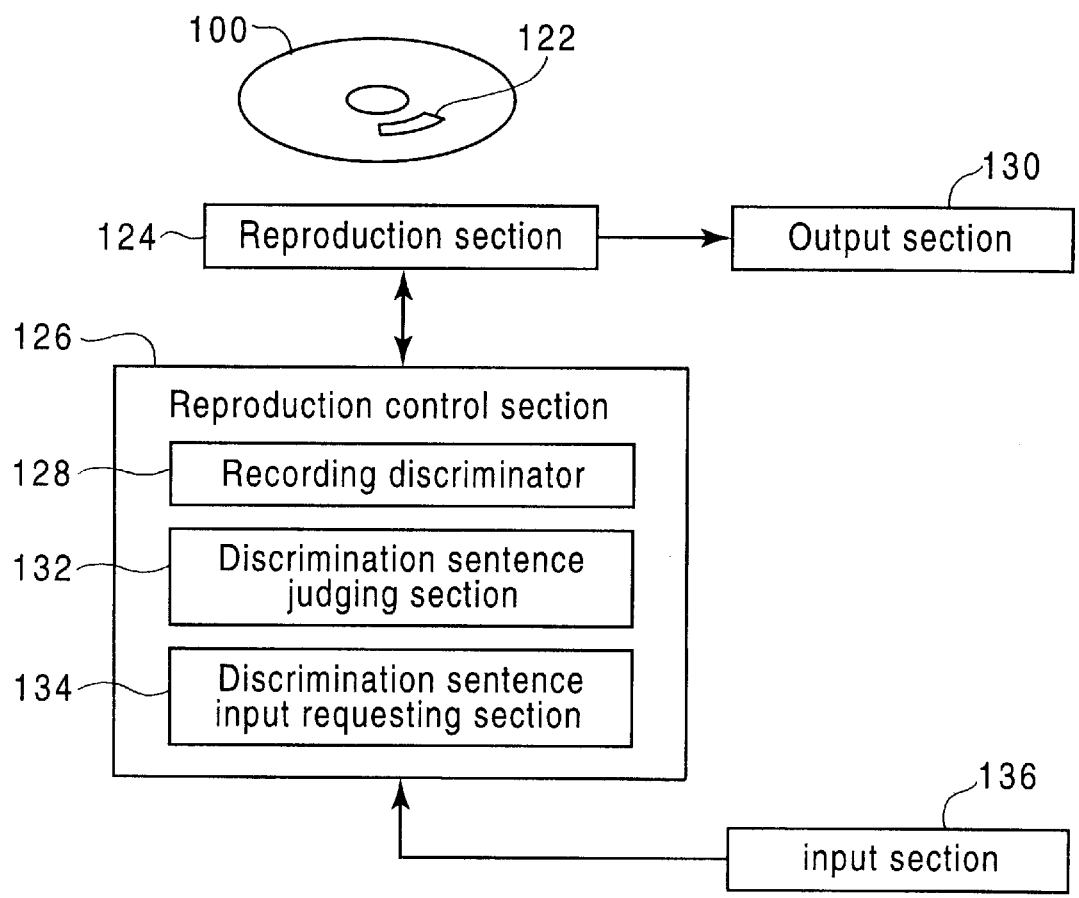
FIG. 12 shows a block diagram of a reproduction apparatus of optical disc according to the third embodiment of the present invention.

FIG. 12 shows a block diagram of a reproduction apparatus of optical disc according to the third embodiment of the present invention.

In the third embodiment of the present invention, a discrimination sentence is utilized for reproducing an optical disc instead of a cipher key. The discrimination sentence is referred to and reproduction of program information is permitted when a correct discrimination sentence is inputted.

In FIG. 10, when a desirable software or title is available in an optical disc (step S71), a user assigns an arbitrary discrimination sentence or a cipher sentence (step S72) and transmits the discrimination sentence and other inherent information such as personal information of the user to pay for the software as well as title information of the preferred software to a software supplier (software house) or an agent (step S73). The personal information includes a registered user ID at the software house, a credit card number, and a bank account number.

A cipher key is produced according to a predetermined algorithm in the software house (step S74), that is, the cipher key is produced by utilizing the preferable discrimination sentence of the user wherein the cipher key is acceptable to all software which are desired by the user and the cipher key contains data such as a discrimination sentence, software which is able to be reproduced, and the personal information as required. The software house writes the cipher key on an optical disc which is requested by the user in exchange for a payment of a cost or fee of utilizing the program information (step S75) wherein the cipher key is written in a BCA (Burst Cutting Area) or a low packing density recording area which are explained in the first embodiment of the present invention. The optical disc wherein the cipher key is written is delivered to the user and the user can play the optical disc by entering the discrimination sentence (step S76). Further, the cipher key can be transmitted to the user in exchange for a payment of a cost and the user can write the cipher key on an applicable optical disc by himself.

In FIGS. 11 and 12, the cipher key is written on a low packing density recording area or a BCA area 122 of an optical disc 100. When the optical disc 100 is loaded in a reproduction section 124, it is checked whether the cipher key is written or not by a recording discriminator 128 of a reproduction control section 126 (step S81 in FIG. 11). In case that the cipher key is not present, reproduction of the optical disc 100 is prohibited or permitted to reproduce only a restricted area of program information by the reproduction section 124 (step S82), and reproduced program information is outputted through an output section 130.

On the other hand, when the recording discriminator 128 judges that the cipher key is present the cipher key information in the BCA area 122 is reproduced, a disc ID information, a title which is permitted to be reproduced, and personal information are read out (step S83). Then a discrimination sentence is requested to be inputted by a discrimination sentence input requesting section 134 (step S84) wherein a content of the request is outputted as a sound or an image by the output section 130. When a discrimination sentence is entered into the input section 136 (step S85), the discrimination sentence is judged whether it agrees with the discrimination sentence which is read out from the BCA area 122 or not by a discrimination sentence judging section 132 (step S86). In the case of coincidence, software is reproduced wherein a title of the software is permitted to reproduce in correspondence to the discrimination sentence (step S87). However, in the case of not coincidence, the reproduction is prohibited or restricted to reproduce nonrestrictive area of program information by the reproduction section 124 (step S82).

In addition thereto, according to the present invention, a cipher key is produced from a discrimination sentence which is preferred by a user, that is, when a discrimination sentence is assumed to be a key, a key hole of each optical disc is produced so as to fit to the key. Therefore, when reproducing program information, a user can input a discrimination sentence instead of a cipher key.

Accordingly, following advantages are present.

(1) A discrimination sentence or a cipher sentence is arbitrarily assigned by a user. Therefore, for example, it is possible to assign a same discrimination sentence to all optical disc which are possessed by a user, so that it is not necessary to memorize individual discrimination sentences of respective optical discs.

(2) When a user intends to utilize one software of an optical disc which is recorded with plural program information such as plural game softwares wherein the desired one software is not registered for utilization at a software house, a new cipher key is necessary. However, the common discrimination sentence as previously utilized can be conveniently used. In this case, although a new optical disc written with a new cipher key which authorizes to utilize the new software, is necessary, an expense of a user is rather low, as a price of an optical disc excluding its contents is very low. It is possible to assign individual discrimination sentences to plural program information as well.

(3) An optical disc is distributed at a low price, since a cost of utilizing program information is charged to an individual program information itself as the same case as the "super distribution system". A user can save money so that the user just pays for preferred program information. Further, as an optical disc is distributed at a very low price, illegal duplication is hardly established as a business. Furthermore, a software house can manage about users, since an optical disc is supplied to a user when a cipher key is requested by the user. In addition thereto, a user can obtain a low priced optical disc and purchase desired program information after sampling nonrestricted program information of each software, so that a distribution of software is activated.

In more specific aspect of the present invention, this invention may be practiced or embodied in still other ways without departing from the spirit or essential character thereof. For instance, following variations are possible.

(1) A cipher key which is produced by a software house can be calculated into a form not recognizable by a user instead of a discrimination sentence. In this case, a discrimination sentence is produced by a reverse calculation when writing a cipher key in an optical disc or reading out a cipher key from an optical disc. A title which is permitted to reproduce, personal information, and permitting level of reproduction can also be processed by calculation and be recorded in a low packing density recording area or BCA area so that security can be more increased.

(2) A cipher key can be written in a low packing density recording area usually only one time. In case that a discrimination sentence assigned by a user is necessary to be changed, a new optical disc must be provided. However, in consideration of an optical disc supplied at a very low price, it is convenient for a user and a software house to supply a new optical disc written with a new cipher key which is based on a new discrimination sentence at a certain fee or free of charge on the basis of taking back an old optical disc wherein a former cipher key is written, once the user pays for the software of the old optical disc.

(3) In the above mentioned third embodiment, a part of program information recorded in an optical disc is permitted to be reproduced by a discrimination sentence. However, it may be allowed to permit reproduction of all the program information in the optical disc.

(4) One discrimination sentence is provided for one optical disc in the above mentioned third embodiment. However, it is possible to contain several discrimination sentences in one cipher key or to assign individual discrimination sentences in correspondence to plural program information in an optical disc. In this case, it can be practiced to restrict reproduction of combinations of arbitrary titles, and it is effective to share one optical disc with several users. For example, in case that game software "GA", "GB", "GC", "GD", and so on are recorded in one optical disc, a user "A" utilizes the game software "GC" by a discrimination sentence "a" and another user "B" utilizes the game software "GA", "GB", and "GC" by a discrimination sentence "b". In this case, if 4 bytes (equals to 32 bits) are assigned to a title key which specifies software being permitted to utilize, for instance, 32 titles of software can be specified totally so that each bit can correspond to one title whether the title is permitted to utilize or not.

(5) Characters such as numeric figures, letters, or symbols may be utilized for a discrimination sentence. A discrimination sentence is preferable to be ranged one byte to 30 bytes in code digits, a name, or a short sentence.

(6) In case of DVD (Digital Video Disc), a BCA (Burst Cutting Area) is preferable to a low packing density recording area.

In addition thereto, according to the present invention, a cipher key is produced by a discrimination sentence preferred by a user so that management of a cipher key is simplified and handling of a cipher key is improved in conjunction with preventing program information from illegal utilization and illegal duplication.

What is claimed is:

1. A cipher key producing method comprising:
   a step of reading a first proper information out from a recording medium wherein the first proper information is inherent to the recording medium and discriminates the recording medium recorded with program information from other recording mediums;
   a step of reading out a second proper information inherent to a reproduction apparatus from a memory means of the reproduction apparatus wherein the second proper information discriminates the reproduction apparatus from other reproduction apparatuses for reading out the program information of the recording medium;
   a step of reading out from the recording medium a specific information which specifies at least one preferred information of the program information; and
   a step of producing at least one cipher key for reading out said one preferred program wherein the cipher key is produced through a calculation process according to a predetermined algorithm by using said first and second proper information and the specific information.

2. A cipher key producing method comprising:
   a step of reading a proper information out from a recording medium wherein the proper information is inherent to the recording medium and discriminates the recording medium recorded with program information from other recording medium;
   a step of reading out from the recording medium a specific information which specifies at least one preferred information of the program information; and
   a step of producing at least one cipher key for reading out said one preferred information wherein the cipher key is produced through a calculation process according to a predetermined algorithm by using said proper information and the specific information.

3. A cipher key producing method comprising:
   a step of reading a proper information out from a recording medium wherein the proper information is inherent to the recording medium and discriminates the recording medium recorded with program information from other recording mediums;
   a step of reading out from the recording medium a specific information which specifies at least one preferred information of the program information; and
   a step of producing at least one cipher key for reading out said one preferred information wherein the cipher key is produced through a calculation process according to a predetermined algorithm by using said proper information.

4. A cipher key producing method comprising:
   a step of reading out a proper information inherent to a reproduction apparatus from a memory means of the reproduction apparatus wherein the proper information discriminates the reproduction apparatus from other reproduction apparatuses for reading out the program information of the recording medium;
   a step of reading out from the recording medium a specific information which specifies at least one preferred information of the program information; and
   a step of producing at least one cipher key for reading out said one preferred information wherein the cipher key is produced through a calculation process according to a predetermined algorithm by using said proper information and the specific information.

5. A cipher key producing method comprising:
   a step of reading a proper information out from a recording medium wherein the proper information is inherent to the recording medium and discriminates the recording medium recorded with program information from other recording mediums;
   a step of assigning a code number by a user;
   a step of receiving the code number from the user; and
   a step of producing at least one cipher key for reading a program information out from the recording medium wherein the cipher key is produced through a calculation process according to a predetermined algorithm by using said proper information and the code number.

6. A cipher key producing method comprising:
   a step of reading a proper information out from a recording medium wherein the proper information is inherent to the recording medium and discriminates the recording medium recorded with program information from other recording mediums;
   a step of assigning a code number by a user;
   a step of receiving the code number from the user;
   a step of reading out from the recording medium a specific information which specifies at least one preferred information of the program information assigned by the user; and
   a step of producing a cipher key for reading out said one preferred information wherein the cipher key is produced through a calculation process according to a predetermined algorithm by using said proper information, and the code number, and the specific information.

7. A cipher key producing method, wherein the cipher key is recorded in other area than a main information area of an optical disc by a request of a user and utilized for reproducing main information comprising:

a step of assigning a discrimination sentence which is utilized for reproducing main information recorded in an optical disc by the user;

a step of selecting a specific information which specifies at least one preferred information of the main information by the user;

a step of transmitting said discrimination sentence and the specific information to a software house; and a step of producing a cipher key for reading out said one preferred information wherein the cipher key is produced through a calculation process according to a predetermined algorithm by using said discrimination sentence and the specific information.

* * * * *